March 25, 1924.

W. C. SHAW

ENGINE LATHE TURRET

Filed Dec. 20, 1922

INVENTOR
WILLIAM C. SHAW.
BY *Fetherstonhaugh & Co.*
ATT'YS.

Patented Mar. 25, 1924.

1,488,071

UNITED STATES PATENT OFFICE.

WILLIAM CLIFFORD SHAW, OF WOODSTOCK, ONTARIO, CANADA, ASSIGNOR TO CANADIAN LINDERMAN COMPANY, LIMITED, OF WOODSTOCK, ONTARIO, CANADA.

ENGINE-LATHE TURRET.

Application filed December 20, 1922. Serial No. 608,050.

*To all whom it may concern:*

Be it known that I, WILLIAM CLIFFORD SHAW, a subject of the King of Great Britain, and resident of the city of Woodstock, in the Province of Ontario and Dominion of Canada, have invented certain new and useful Improvements in Engine-Lathe Turrets, of which the following is a specification.

This invention relates to improvements in turret or tool posts for use on ordinary engine lathes, and particularly to the support for the turret or tool post, and the object of the invention is to effectually support the said turret or tool post.

It is usual to attach such turrets to the cross slide or to the lathe carriage. The bearings of these slides are not ordinarily sufficiently large and are not so disposed as to withstand the stress of heavy cuts with projecting tools.

The present invention overcomes this difficulty by providing an extension on the base of the turret or tool post extending towards the tail of the lathe, together with supporting means for the same having slidable engagement therewith, all as hereinafter more fully set forth and described in the accompanying specification and drawings.

In the drawings.

In the drawings, like characters of reference indicate corresponding parts in all the figures.

Figure 1:
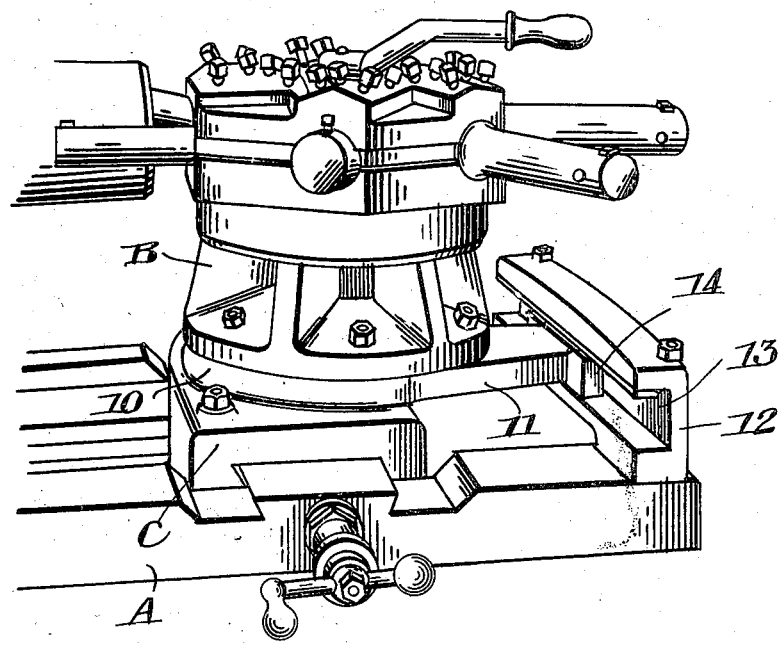
Figure 1 is a perspective view of an embodiment of the invention.
Figure 2:
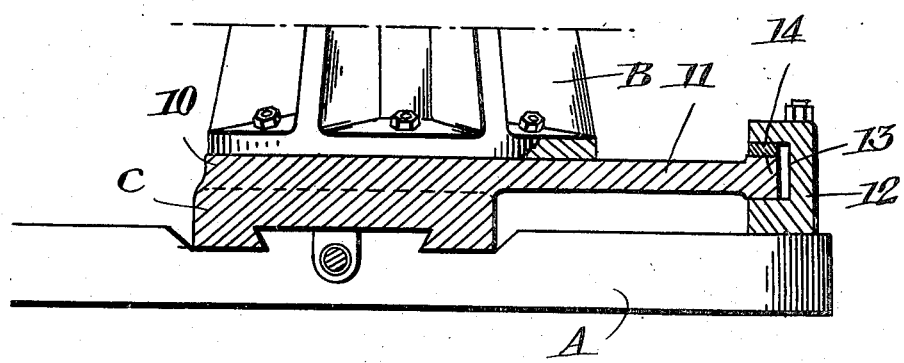
Figure 2 is a sectional elevation of the same.

Referring to the drawings:

A represents a portion of an engine lathe carriage of any convenient type and B, the attached turret tool post. C represents the cross-slide adapted to be moved transversely by the usual means and including a base 10 for the bottom of the turret or tool post B.

In accordance with the present invention a laterally extending supporting member 11 is formed on the base and which extends towards the tail end of the lathe and is given slidable support by means of a transversely extending channel member 12 having a groove 13 which receives and slidably engages a projection or block 14 on the end of the member 11.

The member 12 may be supported in position from the rear of the lathe carriage or an extension thereof.

It will be seen that the member 11 extending laterally from the base of the tool post or turret will give a constant support to the same, and enable it to withstand any stress produced by a heavy cut or the like.

The greater distance between extreme supports and the more direct manner of opposing the cutting action made possible by this device, allow of heavier cuts and greater tool overhang without the destructive tipping action usually present in existing turrets fitted to the narrow slides of standard engine lathes. This is often aggravated by the fact that uneven wear makes it impossible to keep the gib tight in all positions. This added support taking a great part of the load, reduces the wear on the cross-slide to a minimum and itself may be easily adjusted.

I am aware that various forms of engine lathe turrets have been provided which are sold for attachment to standard engine lathes, but these engine lathe turrets of the prior art have depended for their support on the support provided for standard cross slide, which, for their purpose, is not sufficiently wide. It will be seen that the present invention overcomes this objection and provides a firm and effective supporting means.

As many changes could be made in the above construction, especially in the design of the bearing of the rear support, and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. In a device of the character described and in combination, a tool post, a base for the same, a cross-slide supporting the base, a laterally extending supporting member connected to the tool post, and means for slidably engaging and supporting the end of the supporting member.

2. In a device of the character described and in combination, a tool post, a base for the same, a cross-slide supporting the base, a laterally extending supporting member connected to the tool post, and means for slidably engaging and supporting the end of the supporting member comprising a member having an opening to receive the end of the supporting member.

In witness whereof I have hereunto set my hand in the presence of two witnesses.

WILLIAM CLIFFORD SHAW.

Witnesses:
 HENRY A. LITTLE,
 M. B. McKAY.